W. H. BERGSTRESER.
GAMBREL.
APPLICATION FILED AUG. 14, 1916.
1,228,174.
Patented May 29, 1917.
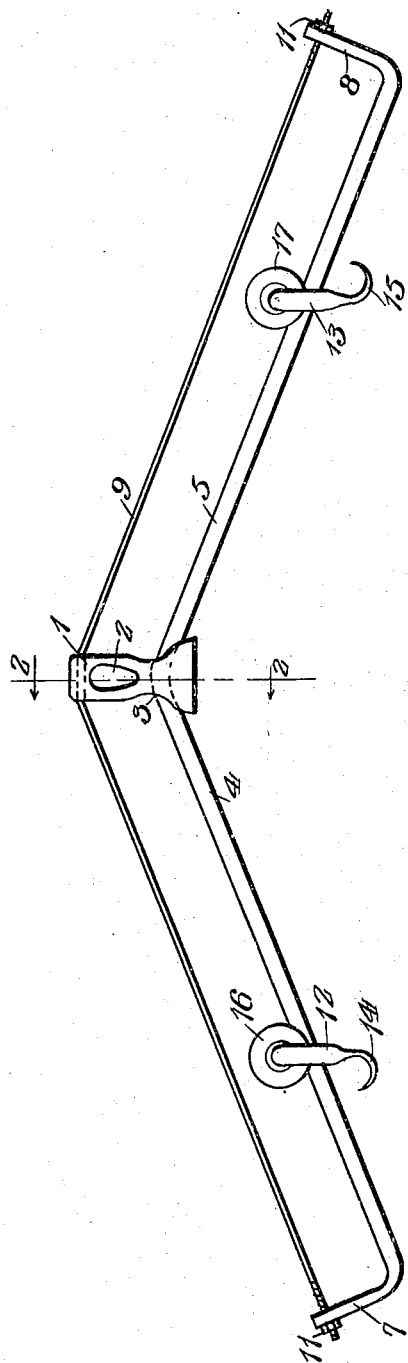
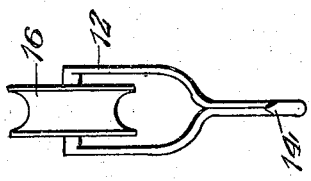
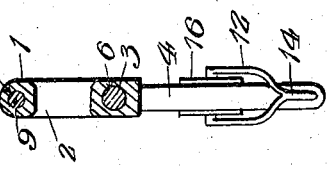
Wilson H. Bergstreser,
Inventor
By Geo. P. Kimmel
Attorney

UNITED STATES PATENT OFFICE.

WILSON H. BERGSTRESER, OF BANCROFT, SOUTH DAKOTA.

GAMBREL.

1,228,174.  Specification of Letters Patent.  Patented May 29, 1917.

Application filed August 14, 1916.   Serial No. 114,830.

*To all whom it may concern:*

Be it known that I, WILSON H. BERGSTRESER, a citizen of the United States, and resident of Bancroft, in the county of Kingsbury and State of South Dakota, have invented certain new and useful Improvements in Gambrels, of which the following is a specification.

The present invention relates to butchering and has particular reference to new and useful improvements in gambrels.

The primary object of my invention is to provide a gambrel of the class hereinafter described having suspending means associated therewith which automatically stretches the meat suspended thereby without the use of springs or the like.

Another object of my invention is to provide a gambrel of the class referred to which is extremely simple in construction, strong and durable, effective in use and cheap to manufacture.

Other objects and advantages to be derived from the use of my improved gambrel will appear from the following detail description and the claims, taken with an inspection of the accompanying drawing, in which:

Figure 1 is a side elevational view of a gambrel embodying the improvements of my invention;

Fig. 2 is a transverse sectional view taken on the line 2—2 of Fig. 1; and

Fig. 3 is an enlarged end view of one of the suspending elements.

Referring more particularly to the drawing, wherein similar characters of reference designate like and corresponding parts throughout the various views, 1 designates a suspending block, said block having a transverse opening 2 therethrough, said opening being adapted for reception of a suspending hook (not shown) for supporting the device of my invention when in use.

The supporting frame includes a rod 3 formed with angularly related arms 4 and 5, said rod 3 passing through an opening 6 formed in the block 1. As best shown in Fig. 1 the arms 4 and 5 extend downwardly from the block 1, the lower free ends of the arms being upturned to form extensions 7 and 8, a truss rod 9 extends through an opening 10 formed in the upper portion of the block 1 and having threaded extremities for engagement with said extensions. Nuts 11 serve to prevent disengagement of the truss rod from said extensions.

The suspending element includes frames 12 and 13 having hooks 14 and 15 on their lower ends. The upper ends of the frames 12 and 13 carry grooved rollers 16 and 17 adapted to run upon the arms 4 and 5.

In use the meat to be suspended is connected between the hooks 14 and 15 and suspended therefrom. The weight of the meat will tend to move the frames 12 and 13 along the arms 4 and 5, thereby automatically stretching the meat without the use of springs or complicated mechanism. Thus it will be seen that the use of the rod 3 is to act as a wedge for forcing the suspending elements apart in order to both suspend and stretch an object carried thereby.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

In a gambrel including a supporting block having openings extending transversely thereof adjacent its upper and lower edges, a supporting frame comprising a rod member extending through the openings adjacent the lower end of said block, said rod including a pair of downwardly extending angularly related arms, extensions formed on the lower ends of said arms, a truss rod extending through the opening adjacent the upper edge of said block, the free ends of the truss rod and said extensions being connected, and suspending means associated with the angularly related arms the movement of which being limited by said extensions for a purpose specified.

In testimony whereof, I affix my signature hereto.

WILSON H. BERGSTRESER.

Copies of this patent may be obtained for five cents each, by addressing the "Commissioner of Patents, Washington, D. C."